United States Patent Office 3,285,411
Patented Nov. 15, 1966

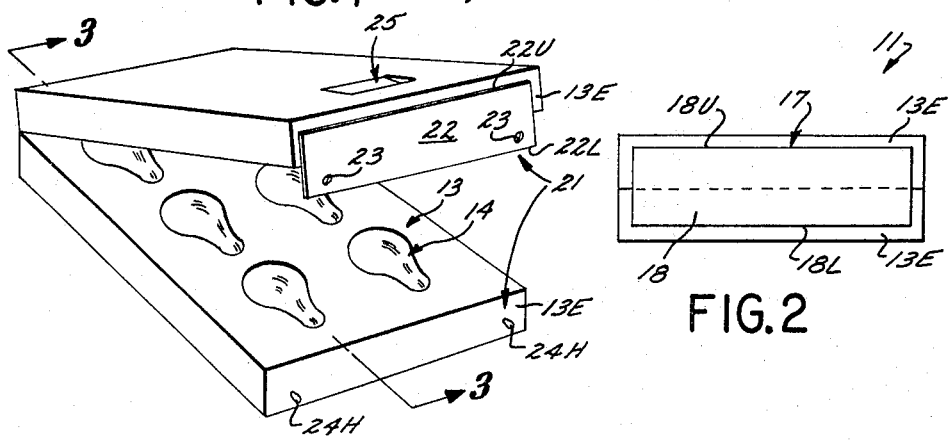
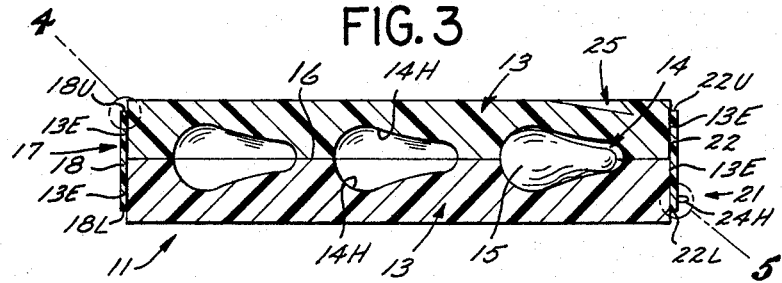
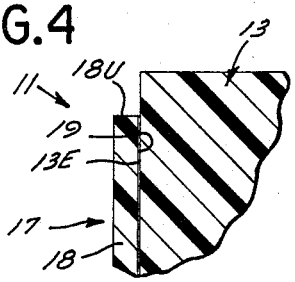
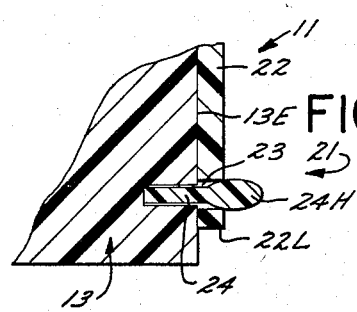
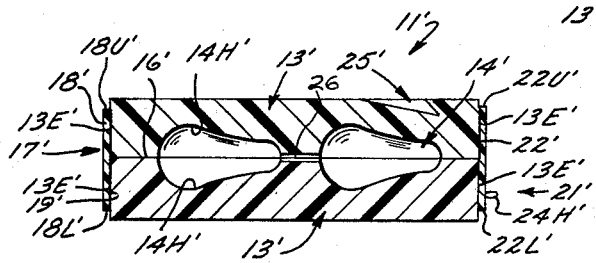
INVENTOR.
EDGAR ENGLISH JR.

3,285,411
RECEIVING, STORING, AND RIPENING DEVICE FOR ONE OR MORE PERISHABLE FOOD OBJECTS
Edgar English, Jr., Edwards, Calif.
(P.O. Box 169, Rosamond, Calif.)
Filed Nov. 17, 1964, Ser. No. 411,735
5 Claims. (Cl. 206—65)

Generally speaking, the present invention relates to the food storing and ripening art, and, more particularly, to a novel receiving, storing, and ripening device for one or more (usually a plurality of) perishable food objects so that said perishable food objects will be fully protected from exterior environmental conditions which might undesirably affect the optimum ripening of the perishable food objects. Furthermore, the device provides an optimum isolated interior environment of a type ideally suited for perfect over-all ripening of the one or more perishable food objects stored within the device. In other words, the novel device of the present invention provides what might be termed a type of protective packaging for easily damaged perishable food objects, such as avocados, fruits, and the like, which are very subject to crushing and bruising damage. In addition, the novel device of the present invention provides a thermally isolated and insulated container means for one or more such perishable food objects adapted to substantially isolate the perishable food objects from variable temperatures between extreme values, such as excessively high and excessively low temperatures. Indeed, the interior of the novel device of the present invention tends to assume a substantially stabilized interior temperature after one or more such perishable food objects are placed therein and after the device is sealingly closed therearound, thus providing an ideal ripening environment which is relatively uniform as to temperature, humidity, and other environmental factors which affect the ripening of perishable food objects such as avocados, fruit, or the like.

Additionally, it should be noted that it has been found that certain types of fruit and other food objects emit certain vapors and/or gases during the ripening thereof, and it has further been found that these gases and/or vapors have a ripening effect upon other substantially unripened similar fruit or food objects. Thus, it will be understood that the entire sealed interior of the receiving, storing, and ripening device of the present invention will tend to disseminate any such gases and vapors produced during the ripening of any of the food objects stored therein throughout the interior thereof so as to hasten the ripening of any food objects stored therein which initially had been ripening at a somewhat slower rate. This has the effect of tending to equalize the ripening rate of all similar perishable food objects, such as fruits or the like, carried within the receiving, storing, and ripening device of the present invention. Also, this factor, plus the stable, substantially uniform environmental conditions within the sealed device of the present invention, tend to produce substantially the same degree of ripening over substantially the entire exterior surface of each avocado or other type of fruit carried within the device during a ripening operation so that it will be found upon removal of such an avocado, or the like, from the device that it will not have just one extremely ripe spot with the rest of the avocado remaining relatively unripened or even "green." Instead, it will be found that the avocado will be ripe over substantially the entire surface thereof and throughout the entire depth thereof to the inner seed. This highly desirable feature of the invention is produced primarily because of the above-mentioned stable and equalized interior environmental conditions found within the receiving, storing, and ripening device of the present invention after it has been sealingly closed around one or more such perishable food objects.

Additionally, it should be noted that the device of the present invention is of extremely simple, inexpensive construction and lends itself to being made in any of a plurality of different sizes and/or configurations, both exterior and interior, whereby to be suitable for receiving, storing, and ripening virtually any desired number of virtually any desired type of such perishable food objects.

With the above points in mind, it is an object of the present invention to provide a novel protective receiving, storing, and ripening device for one or more perishable food objects and adapted to very positively isolate and/or insulate said one or more perishable food objects from exterior environmental conditions and, in particular, from such exterior environmental conditions which may undesirably affect the optimum substantially equalized and over-all ripening of the complete volume of each of said perishable food objects.

It is a further object of the present invention to provide a device of the character referred to in the preceding object, wherein positive thermal insulation and isolation is effectively provided whereby to bring about a substantially thermally stabilized and equalized condition within the interior of the device when sealingly closed whereby to subject each perishable food object stored therein to substantially the same interior environmental conditions.

It is a further object of the present invention to provide a device of the character referred to hereinabove, which is additionally provided with appropriately positioned interior ventilation aperture means for facilitating interior ventilation and heat transfer between any or all of a plurality of recess means positioned within the device and adapted to individually receive therein a corresponding plurality of perishable food objects, thus tending to further enhance the interior stabilization of environmental conditions to which each such recess means, and the perishable food object adapted to be carried therein, is subjected after the device is sealingly closed.

It is a further object to provide a receiving, storing, and ripening device, having the advantages referred to herein and including the features referred to herein, generically and/or specifically, and individually or in combination, and which is of extremely simple, inexpensive construction adapted for large-scale mass manufacture at very low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated in the hereinbelow-described figures of the accompanying single drawing sheet and are described in detail hereinafter.

FIG. 1 is a reduced-size three-dimensional view illustrating one exemplary embodiment of the invention in partially open relationship.

FIG. 2 is a rear elevational view of the device of FIG. 1 when in fully closed and sealed relationship.

FIG. 3 is a sectional view taken substantially along the plane indicated by the arrows 3—3 of FIG. 1, but shows the device after it is in the fully closed and sealed relationship shown from the rear in FIG. 2. Also, it should be noted that, in this view, the right hand recess means defined between the upper and lower portions of the sealingly closed device of FIG. 3, is shown as carrying therein an avocado, which is exemplary of the remaining five recess means of the sealingly closed device shown in FIG. 3.

FIG. 4 is an enlarged fragmentary sectional detailed view of the portion of FIG. 3 lying within the circle designated at 4 and more clearly, although fragmentarily, illustrates one exemplary form of hinge means.

FIG. 5 is an enlarged fragmentary sectional detailed view of the portion of FIG. 3 lying within the circle designated at 5 and more clearly, although fragmentarily, illustrates one exemplary form of controllably engageable and disengageable fastening and locking means for fastening the upper and lower portions of the device in sealingly closed relationship with respect to each other.

FIG. 6 is a sectional view generally similar to FIG. 3, but illustrates a slightly modified form of the invention adapted to receive, store, and ripen a lesser number of avocados, pears, or other fruit or the like. Also, this view illustrates a modified feature of the invention comprising interior ventilation means which effectively communicates the plurality of recess means for quick interior environmental stabilization after the entire device is sealingly closed into the relationship clearly shown in FIG. 6.

Generally speaking, the exemplary first form of the invention illustrated in FIGS. 1–5 may be said to comprise container means, such as is generally designated at 11, and which is shown as being substantially rectangular as seen in plan view, although the invention is not specifically so limited.

In the exemplary form illustrated, the container means 11 effectively comprises a pair of vertically adjacent area-coextensive compressible and thermally insulating pad means having at least two (and usually a plurality of) opposed mating vertically aligned recess means half portions formed therein.

In the exemplary first form of the invention illustrated, the two vertically adjacent area-coextensive compressible and thermally insulating pad means are generally designated at 13, and the opposed mating vertically aligned recess means half portions formed therein are designated by the reference character 14H. This is true with respect to both the upper and lower protective compressible pad means 13 and the upper and lower recess means half portions 14H formed therein.

Each vertically aligned pair of recess means half portions 14H together define a corresponding one of a plurality of complete recess means, each of which is generally designated by the reference numeral 14 and each of which is appropriately shaped for the reception, storing, and ripening of a certain specific predetermined type of perishable food objects.

In the first exemplary form of the invention illustrated, each of the recess means 14 is intended primarily for the reception therewithin of a substantially correspondingly shaped avocado, or, in certain cases, of a pear, and is so shaped as to be in surface contact with substantial surface areas of the corresponding avocado or pear when such is received within the corresponding recess means 14, whereby to firmly and protectively support such an avocado or pear within the corresponding recess means 14 in nested relationship therein as is clearly shown with respect to the right recess means 14 illustrated in FIG. 3, wherein an avocado 15 is clearly shown as being positioned therewithin and in surface contact with substantial areas of the right recess means 14. Of course, it should be understood that the various other recess means 14 may also carry avocados similar to the exemplary one shown at 15, and the only reason that such avocados are not shown in the other recess means 14 is for purposes of drawing simplification and clarity. The arrangement is such that each avocado or the like, such as the one shown at 15 in FIG. 3, is received within the corresponding recess means 14 in a manner such as to be firmly and protectively supported in what might be termed a "nested" relationship therein.

This not only provides maximum protection for all such avocados, as exemplified by the one shown at 15 in FIG. 3, from any exteriorly caused bruises or crushing damages, but also provides thermal isolation and insulation since the upper and lower compressible pad means 13 are preferably made of a compressible expanded plastic foam material having the desired qualities of resiliency and lightness for effective mechanical protection while minimizing over-all weight and also comprising a high efficiency thermal insulating means.

Additionally, the material of which the two compressible pads 13 are made may, in certain forms of the invention, have substantial hysteretic loss characteristics whereby to optimize the damping characteristics thereof which will result in minimizing the effect of vibration applied to the exterior of the complete container means 11.

One material having the characteristics referred to above is a polystyrene (or, in certain cases, polyurethane) foam material which is of an expanded cell type. The characteristics of such material with respect to thermal insulation and also with respect to hysteretic loss can be modified to a considerable degree by variation of the ratio of closed cells to open cells ranging from zero to one hundred percent and may also be modified by including other ingredients in association with the polystyrene (or polyurethane) foam material; said ingredients being such as to either increase or decrease the hysteretic loss characteristics and/or to increase or decrease the thermal insulation characteristics.

In certain cases, the outer surfaces of the complete container means 11 or the inner surfaces thereof, or both outer and inner surfaces thereof, may be effectively closed and/or sealed with respect to the cellular or porous structure thereof. This may be accomplished in any of a variety of ways, such as by heat-sealing same, or by compressing any of said surfaces to a slight degree while heating same so as to close the surface thereof while leaving the interior portions of the material still in relatively expanded cellular form. Any of these arrangements are intended to be included and comprehended herein as being within the broad scope of the present invention.

The above-mentioned factors may be modified within the broad scope of the present invention to provide optimum relationships thereof for various particular usages to which the particular containers are to be put—that is, in accordance with the type of environmental conditions which a particular container may encounter.

It will be noted that, in the exemplary first form of the invention illustrated, the lowermost one of said compressible pad means 13 effectively comprises a corresponding lowermost wall portion of the complete container means 11, while the uppermost one of said compressible pad means 13 effectively comprises a corresponding oppositely positioned uppermost wall portion of said container means, with said lowermost and uppermost wall portions (comprising said compressible pad means 13) together comprising and defining the complete container means 11.

It will be noted that, in the exemplary first form of the invention illustrated, the two compressible pad means 13, which are in vertically stacked, vertically adjacent, area-coextensive relationship, have a substantially horizontal interface junction plane 16 therebetween. However, it should be noted that the invention is not specifically so limited in all forms thereof. Indeed, in certain forms of the invention, the pair of compressible pad means 13 may be positioned adjacent to each other in a direction other than vertically adjacent, and the interface junction plane 16 may be positioned other than horizontal. Additionally, there may be more than one such interface junction plane, similar to the one shown at 16, and indeed, there may be more than two such compressible pad means, such as the two shown at 13. All such arrangements are intended to be included and comprehended within the broad scope of the present invention.

It will be noted that, in the exemplary first form illustrated, the two compressible pad means 13 effectively comprise and define the container means 11 in themselves and without the provision of any exterior carrying structure or outer container means. However, such an exterior outer container means may be provided in certain forms of the invention, and may comprise a container lower portion and a container upper or closure portion and may be adapted to carry two or more compressible pad means, such as the two shown at 13, therewithin.

The two compressible pad means 13, comprising and defining the container means 11, are provided adjacent to similar ends thereof with effective hinge means, such as is generally designated at 17, hingedly interconnecting same whereby to mount said two compressible pad means 13 for relatively rotatably opening and closing movement thereof, as is perhaps best illustrated in FIG. 1.

In the exemplary form of the invention illustrated, said effective hinge means 17 is shown in a particular exemplary form wherein it comprises a flexible thin-sheet panel member 18 which may be made of a suitable plastic material or the like and having one portion (actually, the upper end portion 18U) joined with respect to a corresponding end portion 13E of the upper compressible pad means 13 and having another portion (actually, a lower end portion 18L) joined with respect to a similar rear end portion 13E of the lower compressible pad means 13 whereby to form the effective flexible hinge means interconnecting same as clearly illustrated in FIGS. 2, 3, and in enlarged fragmentary detail in FIG. 4. It will be noted that, as is best shown in FIG. 4, the joining of the ends 18U and 18L of the flexible panel member 18 comprising the hinge means 17 to the corresponding ends 13E of the upper and lower compressible pad means 13 may comprise adhesive junctions, cohesive junctions, or otherwise as is designated by the junction plane indicated fragmentarily at 19 in FIG. 4.

The exemplary first form of the invention is also provided with fastening and locking means, generally designated at 21, for controllably fastening the upper and lower compressible pad means 13 together in substantially sealed and closed relationship, as is illustrated in FIGS. 2 and 3 which is normally done after a desired number of perishable food objects are placed within the recess means 14.

In the exemplary first form of the invention illustrated, the fastening and locking means 21 comprises first and second elements, with said first element comprising a flexible panel member 22 of plastic material or the like, having one portion (actually, an upper end portion 22U in the form illustrated in FIG. 3) effectively fastened or joined with respect to the opposite end portion 13E of the upper compressible pad means 13 from that to which the upper end 18U of the hinge panel member 18 is joined. Also, in the exemplary first form of the invention illustrated, said fastening and locking flexible panel 22 has another connection end portion (actually, the lower end portion 22L in the form shown in FIGS. 3 and 5) which extends downwardly across the junction plane 16 into a position therebelow adjacent to a similar lower right end portion 13E of the lower compressible pad means 13 where said lower end portion 22L is provided with engagement aperture means 23 controllably resiliently and frictionally engageable and disengageable with respect to the enlarged head 24H of the second engagement element of said fastening and locking means 21, which merely comprises a projection element 24 carried by said lower right end 13E of the lower compressible pad means 13. This is most clearly shown in enlarged fragmentary form in FIG. 5.

It should be noted that the upper end portion 22U of the flexible locking panel 22 may be joined to the upper right end 13E of the upper compressible pad means 13 by adhesive means, cohesive means, or otherwise in a manner generally similar to the showing at 19 in FIG. 4 of the fastening of the previously described flexible hinge panel 18.

It will be understood that the arrangement is such that the lower end or connection portion 22L of the fastening and locking panel 22 may be manually forcibly moved into the engaged and locked relationship clearly shown in FIGS. 3 and 5 which, because of the slight stretching of the panel 22 which is required for this locking operation, effectively sealingly fastens the upper and lower compressible pad means 13 together. On the other hand, said lower connection end portion 22L of the flexible fastening and locking panel 22 may be similarly forcibly removed from the locked relationship with respect to the projection element 24, which will allow the entire device to be moved upwardly by way of the rotative freedom provided by the hinge means 17 until any desired degree of relative opening of the upper and lower compressible pad means 13 has been achieved. This allows any desired number of perishable food objects, such as avocados or the like, as exemplified by the one shown at 15 in FIG. 3, to be placed within the corresponding recess means 14, after which the upper and lower compressible pad means 13 are moved into the closed relationship shown in FIG. 3 and the fastening and locking means 21 is fastened and locked in the relationship shown in FIGS. 3 and 5 whereby to sealingly enclose said perishable food objects within the interior of the container means 11 where they will remain during a subsequent storage and ripening period.

Incidentally, it should be noted that the fastening and locking means 21 may consist of a single locking aperture 23 and a single locking projection element 24, or may consist of a pair of each of same laterally separated from each other as is clearly shown in FIG. 1.

In order to facilitate opening and closing movement of the upper compressible pad means 13 or to facilitate carrying the entire device, the upper surface of the upper compressible pad means 13 is provided with a top-positioned flush-mounted finger-engageable hand-hold or handle means, generally designated at 25, which is formed downwardly in the upper surface of the upper compressible pad means 13 in a recessed manner, thus providing no undesirable upward projections above the upper surface of the upper compressible pad means 13, which would undesirably affect the ready storage and stackability of the complete container means 11.

FIG. 6 illustrates a very slight modification of the first form of the invention illustrated in FIGS. 1–5 and described in detail hereinbefore. This modification is different in two respects from the first form of the invention, the first difference comprising the fact that it is intended to carry only two rows and/or two intersecting columns of the recess means, which, in this case, are designated by the reference numeral 14'. In other words, the modified container means 11' illustrated in FIG. 6 is adapted to carry only four perishable food objects rather than six as illustrated in the first form of the invention. However, this is merely to indicate that variation in the number of recess means, is intended to be included and comprehended within the broad scope of the present invention. Actually, any desired number of such recess means may be carried by the device.

The second difference of the modified form of the invention illustrated in FIG. 6 from the previous form illustrated in FIGS. 1–5 and described in detail hereinbefore is the fact that the recess means 14' are provided with interior ventilation aperture means as indicated at 26, which effectively communicates the plurality of recess means 14' whereby to bring about interior environmental stabilization much more rapidly than would otherwise be the case. As pointed out in considerable detail hereinbefore, this may be desirable when ripening certain types of perishable food objects, and under such circumstances ventilation aperture means, such as shown at 26, or functional equivalents thereof may be employed. However, it should be clearly noted that such ventilation aperture means are not limited to the smaller size device illustrated in FIG. 6, but may be employed in the first form of the invention or in any other size or configuration which the device may take under varied conditions of use.

Parts of the modified form of the invention shown in FIG. 6 and similar to those of the first form of the invention are designated by similar reference characters, primed, however.

It should also be noted that the type of hinge means designated at 17 in the first form of the invention and at 17' in the second form thereof and/or the type of fastening and locking means designated at 21 in the first form of the invention and designated at 21' in the second form thereof, are exemplary only and are not to be construed as specifically limiting the invention to said specific types of hinge means and/or fastening and locking means. Actually, various other functional equivalents may be employed in lieu thereof, although the particular arrangements illustrated are highly advantageous because of their simplicity and because of the inexpensive nature thereof.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A receiving, storing, and ripening device for one or more perishable food objects, comprising: container means taking the form of a pair of closely adjacent area-coextensive compressible and thermally insulating pad means having a plurality of opposed mating aligned recess means half portions formed therein, each of said opposed mating recess means half portions cooperating with the similar adjacent aligned recess means half portions whereby to define a corresponding plurality of complete substantially fully enclosed recess means adapted to receive and physically protectively and thermally isolatingly support a corresponding plurality of substantially similarly shaped and sized perishable food objects therein with said mating recess means half portions being in surface contact with substantial surface areas of said perishable food objects whereby to firmly resiliently protectively support same within said recess means in nested thermally isolated and insulated relationship with respect to the exterior of said container means, a first one of said pair of compressible pad means comprising a corresponding wall portion of said container means, a second one of said pair of compressible pad means comprising a corresponding oppositely positioned wall portion of said container means and together therewith comprising said container means, said compressible pad means being formed of a compressible expanded-cell type of foam material comprising a high-efficiency thermal insulating means, said pair of compressible pad means, comprising said container means, being provided, adjacent similar ends thereof, with effective hinge means hingedly interconnecting same whereby to mount said two compressible pad means for hinged relatively rotatable opening and closing movement thereof; and controllably engageable and disengageable fastening and locking means including first and second cooperable locking means portions carried respectively by different ones of said two compressible pad means adjacent to opposite ends thereof from said effective hinge means for effectively but controllably releasably and openably locking said two compressible pad means into said closely adjacent relationship defining said plurality of recess means therebetween.

2. A device as defined in claim 1, wherein at least one of said pair of compressible pad means comprising said container means is provided with a flush-mounted recessed finger-engageable handle means formed therein.

3. A device as defined in claim 1, wherein at least one of said pair of compressible pad means comprising said container means is provided with a flush-mounted recessed finger-engageable handle means formed in a top surface portion thereof.

4. A receiving, storing, and ripening device for one or more perishable food objects, comprising: container means taking the form of a pair of closely vertically adjacent area-coextensive compressible and thermally insulating pad means having a plurality of opposed mating vertically aligned recess means half portions formed therein, each of said opposed mating recess means half portions cooperating with the similar vertically adjacent and vertically aligned recess means half portions whereby to define a corresponding plurality of complete substantially fully enclosed recess means adapted to receive and physically protectively and thermally isolatingly support a corresponding plurality of substantially similarly shaped and sized perishable food objects therein with said mating recess means half portions being in surface contact with substantial surface areas of said perishable food objects whereby to firmly resiliently protectively support same within said recess means in nested thermally isolated and insulated relationship with respect to the exterior of said container means, a lowermost one of said pair of compressible pad means comprising a corresponding lowermost wall portion of said container means, an uppermost one of said pair of compressible pad means comprising a corresponding uppermost wall portion of said container means of a shape similar to the shape of said lowermost one of said compressible pad means, as seen in plan view, and together therewith comprising said container means, said compressible pad means being formed of a compressible expanded-cell type of foam material comprising a high-efficiency combination thermal insulating means and vibration and shock isolation means, said lowermost and uppermost compressible pad means, comprising said container means, being provided, at similar ends thereof, with effective hinge means hingedly interconnecting same whereby to mount said two compressible pad means for hinged relatively rotatable opening and closing movement thereof, said effective hinge means comprising a flexible thin-sheet panel member of plastic material having one portion connected and joined with respect to an end portion of the lowermost one of said two compressible pad means and having another portion connected and joined with respect to a similar end of the uppermost one of said two compressible pad means whereby to form effective flexible hinge means interconnecting same; and controllably engageable and disengageable fastening and locking means including first and second cooperable locking means portions carried respectively by different ones of said two compressible pad means at opposite ends thereof from said effective hinge means for effectively but controllably releasably and openably locking said two compressible pad means into said closely vertically adjacent relationship defining said plurality of recess means therebetween, said first locking means portion comprising a first engagement element including a flexible panel of thin-sheet plastic material having a junction portion effectively joined with respect to an opposite end portion of said uppermost one of said two compressible pad means and having a connection portion provided with engagement aperture means extending therefrom into a position adjacent to the similar end portion of the lowermost one of said two compressible pad means, said second locking means portion comprising a second engagement element including a headed projection element projectingly carried by said similar end portion of said lowermost one of said two compressible pad means.

5. A device as defined in claim 4, wherein the uppermost one of said pair of compressible pad means comprising said container means is provided with a top-positioned flush-mounted recessed finger-engageable handle means formed therein.

References Cited by the Examiner

UNITED STATES PATENTS

| 2,619,251 | 11/1952 | Schmidt | 220—94 |
| 3,135,456 | 6/1964 | Palazzolo | 229—44 |

FOREIGN PATENTS

| 550,275 | 8/1956 | Belgium. |
| 591,439 | 4/1925 | France. |
| 219,407 | 7/1924 | Great Britain. |

THERON E. CONDON, *Primary Examiner.*

WILLIAM T. DIXSON, JR., *Examiner.*